United States Patent [15] 3,673,760
Canamero et al. [45] July 4, 1972

[54] PACKAGING METHOD AND APPARATUS

[72] Inventors: Ernest V. Canamero, Fair Lawn, N.J.; Christoph Ullmann, St. Mang/near Kempten, Germany

[73] Assignee: American Can Company, Greenwich, Conn.

[22] Filed: Oct. 26, 1970

[21] Appl. No.: 83,902

[52] U.S. Cl. ............................. 53/22 A, 53/112 A, 226/173
[51] Int. Cl. ..................................................... B65b 31/02
[58] Field of Search .................. 53/22 R, 22 A, 112 R, 112 A

[56] References Cited

UNITED STATES PATENTS

| | | | |
|---|---|---|---|
| 2,888,787 | 6/1959 | Cloud | 53/22 R |
| 3,524,298 | 8/1970 | Hamilton | 53/22 A |

Primary Examiner—Travis S. McGehee
Attorney—Robert P. Auber, George P. Ziehmer, Leonard R. Kohan and Harries A. Mumma, Jr.

[57] ABSTRACT

An automatic packaging machine makes hermetically sealed packages from which air has been exhausted by laminating two continuous sheets of packaging material. A roll of film on one end of the machine supplies a continuous support sheet to a chain belt conveyor which grips the opposite edges of the support sheet leaving the web unsupported, and transports this sheet the length of the machine. A vacuum forming die makes a plurality of receptacles in the support sheet in aligned longitudinal and transverse rows with transverse and longitudinal margins about the periphery of the receptacles. Another roll of film supplies a continuous cover sheet which is applied over the support sheet, the cover sheet being expediently severed longitudinally by a cutting blade in alignment with the inner longitudinal margins between the receptacles prior to application over the support sheet. The sheets are then heat sealed along the transverse margins. Subsequently, an evacuation unit heat seals the sheets along the outer longitudinal edge margins and an evacuation head exhausts the air from the receptacles through the evacuation opening advantageously provided by the severed cover sheet. A sealing bar in the evacuation head then closes the opening and the cover sheet is finally heat sealed to the support sheet in the areas adjacent the opening.

18 Claims, 22 Drawing Figures

PATENTED JUL 4 1972

INVENTORS
Ernest V. Canamero
BY Christoph Ullmann
L. R. Kolan
ATTORNEY

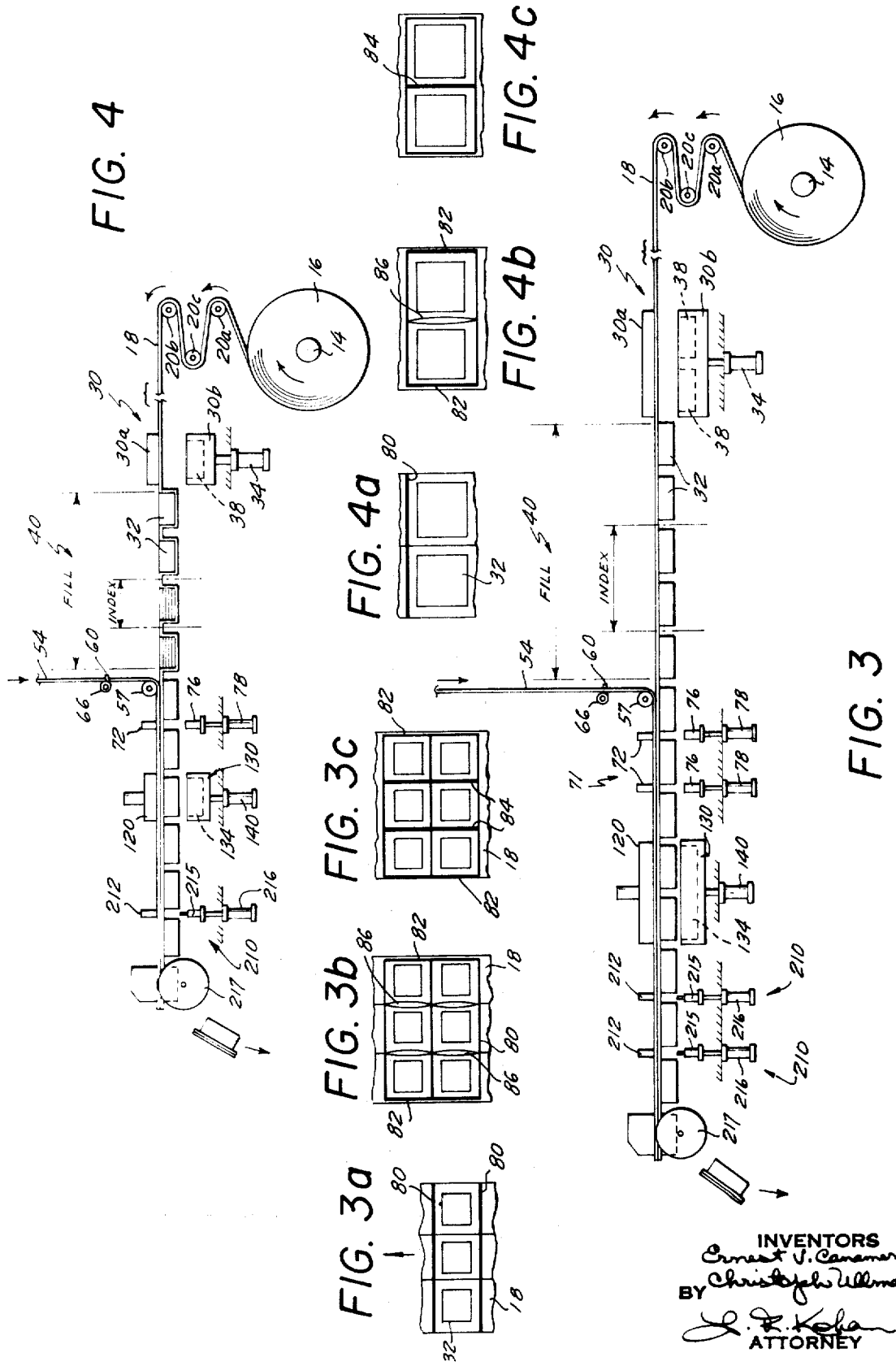

PACKAGING METHOD AND APPARATUS

SUMMARY OF THE INVENTION

This invention relates to a novel method and apparatus for making hermetically sealed packages from which air has been exhausted and more particularly to an advantageously designed packaging machine for automatically making such packages from two continuous sheets of flexible packaging material.

Methods and machines for making hermetically sealed packages from which air has been evacuated by laminating two continuous sheets of plastic film are known. In making such packages it is highly desirable to be able to rapidly package items of a variety of sizes and shapes with the same apparatus that can sequentially evacuate successive groups of packages wherein the number, size and arrangement of the packages in each group may be varied to conform to the desired package size.

Accordingly it is an object of this invention to provide a novel method and apparatus readily adaptable for packaging different size items sequentially in successive groups at a relatively rapid rate.

It is another object of this invention to provide a novel method and apparatus readily adapted to sequentially process packages in successive groups arranged in longitudinal and transverse rows which row arrangement may be altered in accordance with the desired package size.

A further object of this invention is to provide an evacuation method and apparatus for evacuating a plurality of packages in a single step.

It is also an object of this invention to provide a novel packaging method and apparatus wherein packages are evacuated in a highly advantageous manner through an opening provided in a severed cover sheet.

Still another object of this invention is to provide a novel packaging method and apparatus which is relatively economical to construct and operate.

It has now been found that the foregoing objects and other advantages can be obtained by a packaging method which includes supplying a continuous support sheet of packaging material at one end of a packaging machine and transporting the sheet with an unsupported web the length of the machine.

A plurality of receptacles are formed in a support sheet in aligned longitudinal and transverse rows with transverse and longitudinal margins about the periphery of the receptacles. The receptacles are then filled with the items to be packaged. The web of a continuous cover sheet is expediently severed in alignment with the inner transverse margins between the receptacles to advantageously provide an evacuation opening. The cover sheet is applied over the support sheet to enclose the receptacles and the items therein and the cover sheet is sealed to the support sheet along the transverse margin between the receptacles. The cover sheet is also sealed to the support sheet along the outer longitudinal edge margins of the sheets and air is evacuated from the packages through the evacuation opening beneficially profided by the longitudinally severed cover sheet. And finally the opening is closed and the cover sheet is heat sealed adjacent the opening along the inner longitudinal margins.

The packaging apparatus includes a conveyance apparatus for transporting the packaging sheets with an unsupported web over the length of the packaging machine past the various packaging stations. A continuous support sheet is fed from a roll of packaging material and is transported by the conveyance apparatus to a vacuum forming die which vacuum forms a plurality of receptacles in the support sheet in a preset row arrangement. A continuous roll of packaging material is mounted above the support sheet for supplying a continuous sheet of packaging material. A severing device is mounted on the machine for longitudinally severing the web of the cover sheet in alignment with the longitudinal space between the receptacles. Transverse sealing bars heat seal the cover sheet to the support sheet along the transverse margin between the receptacles. The packages are then conveyed to a sealing and evacuation unit where the cover sheet is heat sealed to the support sheet initially only along the outer edge margins of the evacuation unit. An evacuation head exhausts the air in the packages through the evacuation opening provided by the severed cover sheet. And finally the evacuation unit heat seals the cover sheet adjacent the opening to the support sheet.

The continuous sheets of packaging material may be the usual plastic film widely adapted for use in similar applications. This invention also contemplates the use of thin continuous sheets of metal such as aluminum for making the packages.

DESCRIPTION OF DRAWINGS

Various other objects and advantages of this invention will be apparent from the following detailed description, claims, and the drawings appended hereto wherein:

FIG. 3 is a diagrammatic side elevation view of the packaging machine of FIG. 1 illustrating a particular mode of operation wherein pairs of transverse rows of packages are sequentially indexed through the various packaging steps;

FIGS. 3a, 3b, and 3c are diagrammatic views illustrating the progressive sealing of the packages for the packaging mode shown in FIG. 3;

FIG. 4 is a diagrammatic view similar to FIG. 3 illustrating another mode of operation of the packaging machine of this invention wherein a single transverse row of packages is sequentially indexed through the various packaging steps;

FIGS. 4a, 4b, and 4c are diagrammatic views illustrating the progressive sealing of the packages for the packaging mode shown in FIG. 4;

DETAILED DESCRIPTION

Figure 1:
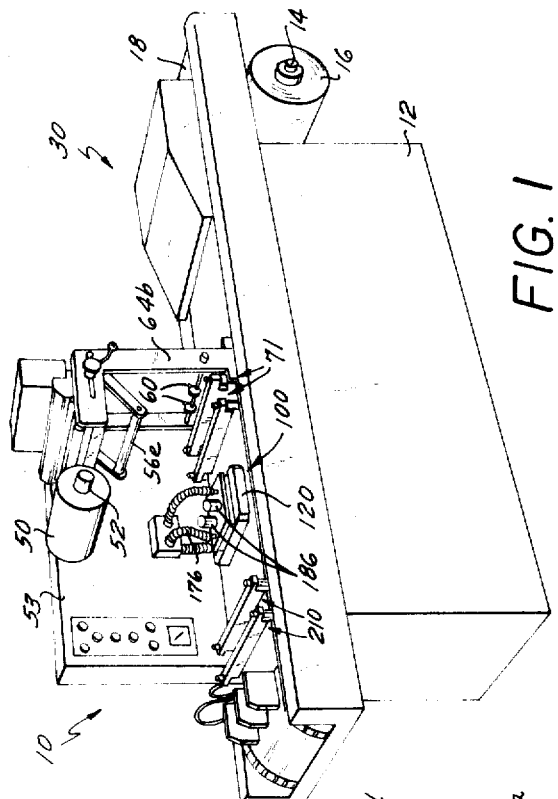
FIG. 1 is a perspective view of the packaging machine of this invention.
Figure 2:
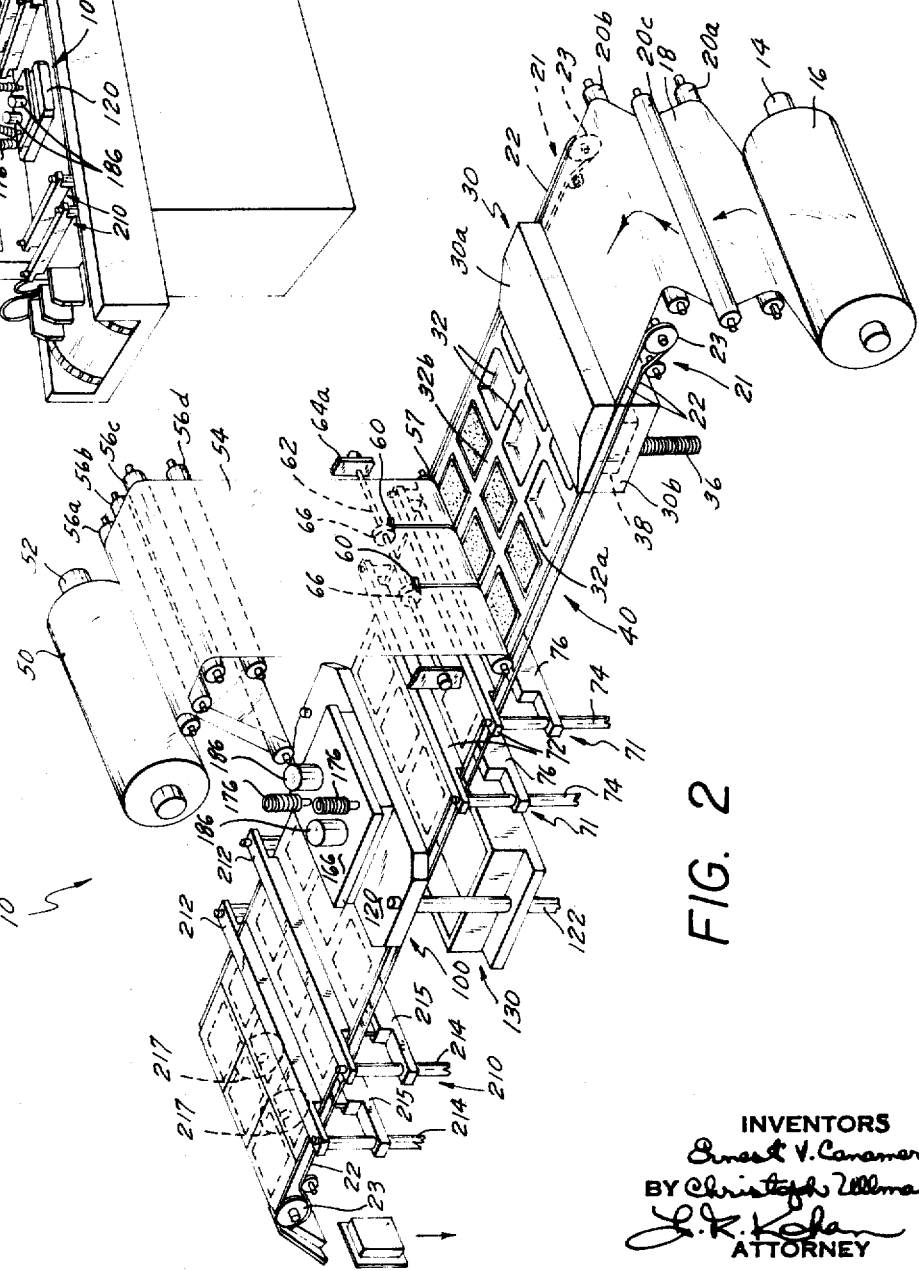
FIG. 2 is an enlarged perspective partially diagrammatic view of certain operating parts of the packaging machine of FIG. 1, with portions omitted for clarity of illustration.

Referring now in detail to the drawings, and particularly to FIGS. 1 and 2, the vacuum packaging machine embodying this invention, generally designated by the reference numeral 10, has a pedestal support or base 12 upon which the operating parts of the machine are mounted. A rotable roll shaft 14 suitably mounted on the right hand end of the base 12, as viewed in FIG. 1, supports a roll of film 16 which supplies a support sheet 18 of flexible plastic material to the vacuum packaging machine 10. As the support sheet 18 is withdrawn from the roll 16, the sheet 18 is engaged by a pair of guide rolls 20a and 20b and an intermediate dancer roll 20c, which rolls cooperate to impart the proper tension to the sheet as it is withdrawn from the roll 16. The roll shaft 14 is provided with a drag or brake device, not shown, which is released by movement of the dancer roll 20c, in order to control the withdrawal of the support sheet 18 from the roll 16.

After passing over the guide roll 20b, the support sheet 18 follows a horizontal path, from right to left as viewed in FIG. 2. Shortly after passing over the guide roll 20b, the support sheet 18 is engaged by a film conveyance apparatus, generally designated by the reference numeral 21, which grips the opposite longitudinal edges of the support sheet 18 and transports the film the entire length of the packaging machine 10 with the unsupported web of the support sheet 18 conveyed there between. The film conveyance apparatus 21 may be operated by conventional mechanical drive means, not shown, housed in the base 12. The drive means imparts intermittent motion to the conveyance apparatus 21 to allow the packaging steps to be sequentially performed during intermittent arrestments of the conveyance apparatus 21.

The packaging machine 10 has a control system, not shown, for regulating the various packaging operations including the drive of the conveyance apparatus 21. The control system may be conventional apparatus well known to those skilled in the art for governing the cycle of the packaging operations. The control system can be a pneumatic type wherein an electric circuit is actuated by a predetermined timing device thereby providing a periodic signal governing the packaging cycle.

As will be described in further detail below, the packaging machine 10 of this invention is readily adaptable to process different size packages and to sequentially form and seal a single or a plurality of transverse rows of packages aligned in two or more longitudinal rows. As illustrated in FIGS. 3 and 4, the span of each indexing movement is set in accordance with the length of the package being formed and the number of transverse rows of packages being simutaneously processed in each successive step. When the vacuum packaging machine 10 is set up to process a single transverse row of packages during each packaging cycle, as illustrated in FIG. 4, the conveyance apparatus 21 will periodically be driven one package length between arrestments. During the arrestment time, the forming, evacuating, and sealing steps are performed on a single transverse row of two or more packages. With the packaging machine adapted to simultaneously package two transverse rows of packages, as illustrated in FIG. 3, the conveyance apparatus 21 will periodically be driven two package lengths between arrestments.

FILM CONVEYANCE APPARATUS

The film conveyance apparatus 21, as illustrated in FIG. 2, has a pair of parallel endless chain belts 22, which extend for the length of the packaging machine 10 and are located on opposite sides thereof. The chain belts 22 are mounted on two pairs of sprockets 23, one pair on one end and the other pair on the opposite end of the machine 10. The sprockets 23 are rotable by the packaging machine drive, whereby the pair of chain belts 22 are movable in aligned relationship over the length of the machine.

In order for the conveyance apparatus 21 to transport the support sheet 18 the length of the machine 10, the chain belts 22 have a plurality of periodically spaced, inwardly disposed clamps, generally designated by the reference numeral 24, which engage the longitudinal edges of the support sheet 18. The clamps 24, illustrated in FIGS. 5—8, are each mounted on the chain belts 22 by means of a generally L-shaped flange 25 which is connected to the belt 22 by suitable fasteners in the form of a pair of rivet type pins 22a which also form part of the linkage of the belt 22. The flange 25 has a lower jaw portion 25a and a C-shaped clip 26 movably mounted thereon having an upper jaw portion 26a which cooperates with the lower jaw portion 25a to grip the support sheet 18. Within the C-shaped clip 26 is an obliquely mounted pin 26b which is fixed to the back of the C-shaped clip 26 and extends downwardly through the flange 25. A sleeve portion 25b is provided in the flange 25 with a suitable internal bore adapted to slideably receive and support the pin 26b.

Figure 5:
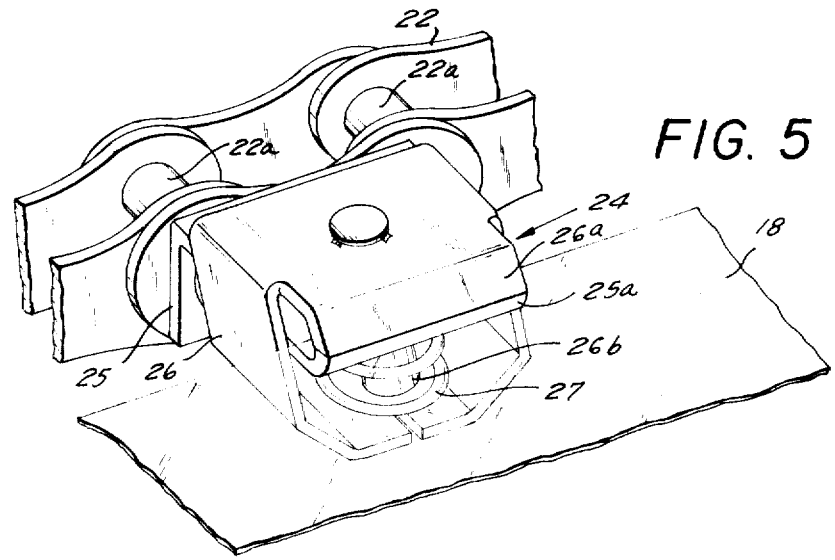
FIG. 5 is an enlarged perspective view of a clamp on the chain belt of the film conveyance apparatus.

The jaw portions 25a and 26a are biased into a closed position by a compression spring 27 disposed about the pin 26b and having one end abutting the clip 26 and the other end in contact with the flange 25. This construction forces the clip 26 downwardly so that the upper jaw portion 26a is biased towards the lower jaw portion 25a whereby the edge of the support sheet 18 may be firmly gripped there between, as illustrated in FIG. 5. Advantageously, the upper jaw portion 26a of the clip 26 has an inclined face that slants inwardly towards the support sheet 18, so that, as illustrated in FIGS. 6 and 7, the support sheet 18 may readily slide over the clip 26 without crimping when the clamp 24 is moved into position and opened for engagement with the support sheet 18.

The underside of each clip 26 is configured to provide an oblique contact surface 26c which is engageable with a similarly configured cam surface 23a on a hub 23b of each sprocket 23. The hub 23b is designed with an appropriate diameter whereby engagement of the cam surface 23a with the contact surface 26c forces the C-shaped clip 26 and the obliquely mounted pin 26b upwardly against the bias of the spring 27 and generally away from the support film 18. The pin 26b slides upwardly within the sleeve 25b, as illustrated in FIG. 7, whereby the jaw portions 25a and 26a are opened to receive the longitudinal edge of the support sheet 18.

Figure 6:
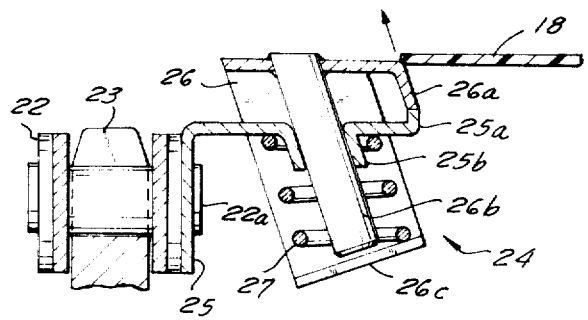
FIG. 6 is a sectional view of the clamp and chain belt of FIG. 5 illustrating the clamp in the closed position prior to engagement with the support sheet.
Figure 7:
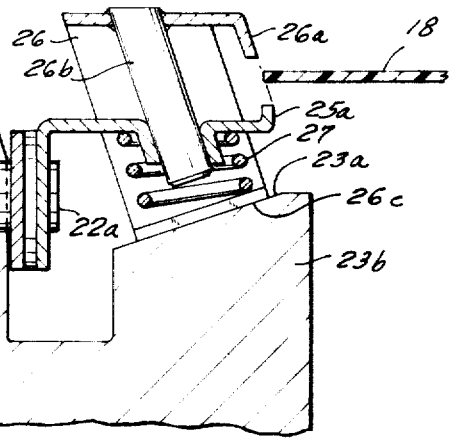
FIG. 7 is a view similar to FIG. 6 with the clamp illustrated in the open position for the reception of the support sheet at the time the clamp is actuated by contact with the cam hub of the chain belt sprocket.
Figure 8:
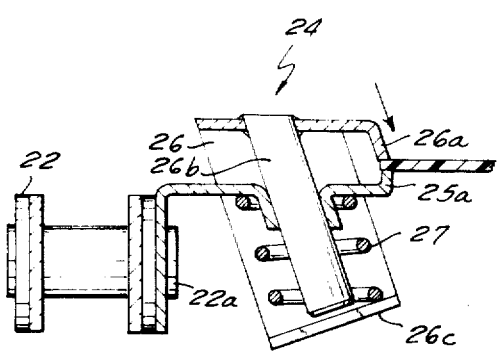
FIG. 8 is a view similar to FIG. 6 illustrating the clamp in the closed position with the lower sheet firmly gripped therein after the clamp has passed the cam hub of the chain belt sprocket.
Figure 9:
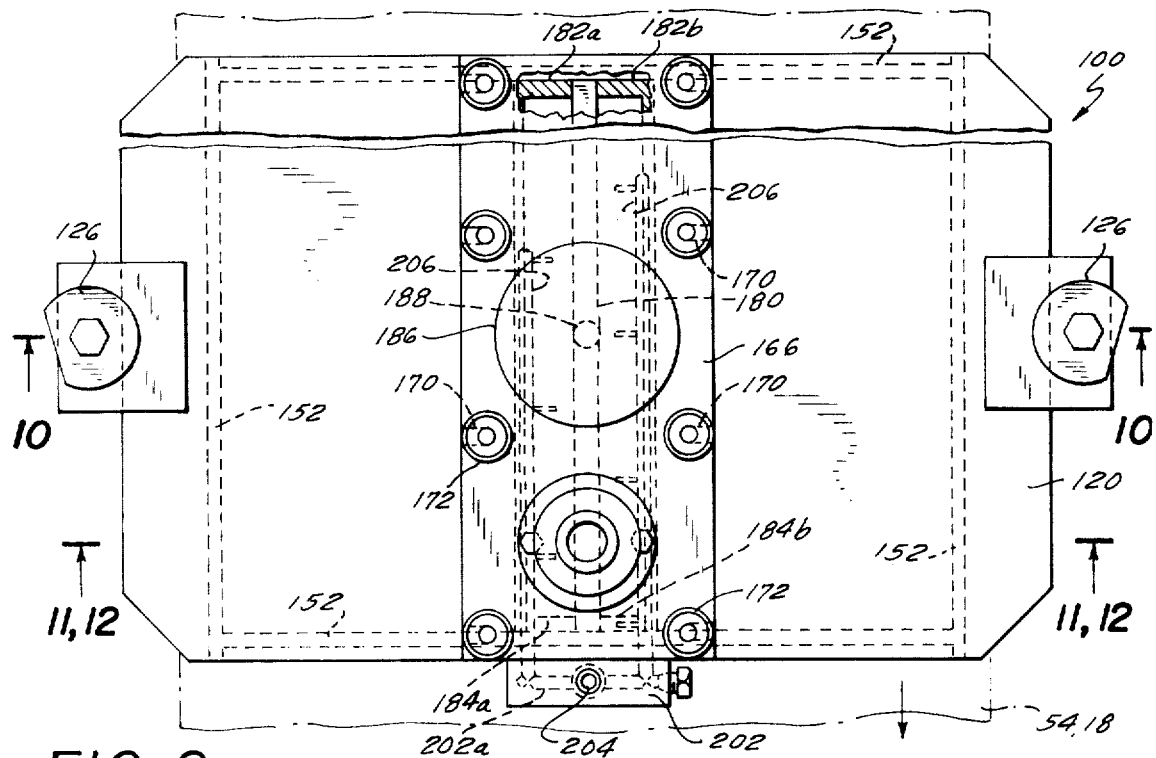
FIG. 9 is a top view of the evacuation unit of the packaging machine of this invention illustrating a unit adapted to operate on pairs of transversely spaced packages.

During operation of the machine 10, when the support sheet 18 moves past the pair of sprockets 23 on the right hand side of the machine, as viewed in FIG. 2, the clamps 24 are moved upwardly toward the support sheet 18 from the position shown in FIG. 6 to the position shown in FIG. 7, as the cam surfaces 23a on the hubs 23b cause the clamps 24 on the belts 22 to open to receive the opposite edge portions of the support sheet 18.

When the clamps 24 move away from the hubs 23b, the jaw portions 25a and 26a move from the open position to the closed position with the edge portion of the support sheet firmly held there between. The continuous chain belts 22 then transport the support sheet 18 the entire length of the machine for the performance of the various packaging steps. After completion of the packaging steps, the support sheet 18 is released when passing the pair of sprockets 23 on the left hand end of the machine 10, as viewed in FIG. 2, in the same manner as illustrated in FIG. 7, when the clamps 24 are opened upon coming in contact with the cam surfaces 23a and the hubs 23b.

FORMING RECEPTACLES IN THE SUPPORT SHEET

Immediately after engagement by the conveyance apparatus 21, the support sheet 18 enters a forming unit, generally designated by the reference numeral 30, where receptacles 32 are formed in the support sheet 18. The forming unit 30 has an upper heating section 30a and a lower receptacle forming die 30b which receive the support sheet there between. When a fresh portion of support sheet 18 has been indexed into position in the forming unit 30 and the conveyance apparatus 21 is temporarily arrested, the machine control activates the heating section 30a, whereby the deformable support sheet 18 is softened. At substantially the same time the machine control activates a conventional air operated piston and cylinder device 34 that moves the die 30b upwardly into contact with the underside of the heated unsupported web of the support sheet 18.

A flexible conduit connects a vacuum pump, now shown, to a vacuum connection 36 communicating with the interior of the chambers 38 of the forming die 30b whereby the heated web of the deformable support sheet 18 is stretched and drawn into the chambers 38 of the die 30b thereby forming receptacles 32. The size, shape, and arrangement of the chambers 38 of the die 30b may be varied in accordance with the type of the package desired. The receptacle forming die 30b is releaseably mounted so that other dies having different chamber configurations may be easily substituted in order to readily adjust the die 30b to form different size packages in the desired arrangement. The receptacles 32 are formed by the die 30b in aligned equally spaced transverse rows and aligned equally spaced longitudinal rows. To provide an area for heat sealing the sheets of film between each of the transverse rows of receptacles 32 a transverse margin 32a of appropriate dimensions is maintained across the full width of the support sheet 18. For the same purpose the support sheet 18 has a similar longitudinal margin 32b maintained between the spaced longitudinal rows of receptacles 32.

After the receptacles 32 have been formed, the receptacle forming die 30b is withdrawn from engagement with the support sheet 18 and the next packaging cycle is commenced. The support sheet 18 with the receptacles 32 formed therein is conveyed to a loading or filling zone 40 where the items to be packaged may be conveniently placed in the receptacles 32 from either side of the machine 10 as the support sheet 18 is indexed past this area.

SUPPLYING A COVER SHEET OF FILM AND SEVERING SAME TO PROVIDE AN EVACUATION OPENING

After the support sheet 18 passes the filling zone 40, in order to enclose the items placed in the receptacles 32 between two sheets of film, a roll 50 mounted on a rotable shaft 52 supported by the base frame 53, supplies a cover sheet 54 for superimposition on the support sheet 18. Guide rolls 56a, 56b, 56c, and 56d, mounted on the frame 53 cooperate with a dancer roll of 56e to apply the desired tension to the cover sheet 54 during withdrawal from the roll 50. The withdrawal of the cover sheet 54 from the roll 50 is controlled by movement of the dancer roll 56e which operates a brake or drag, not shown, retarding the rotation of the shaft 52. When the cover sheet 54 passes over the guide rolls 56c and 56d, the sheet 54 is directed downwardly into engagement with another guide roll 57 where the cover sheet 54 is superimposed on the support sheet 18.

Figure 13:
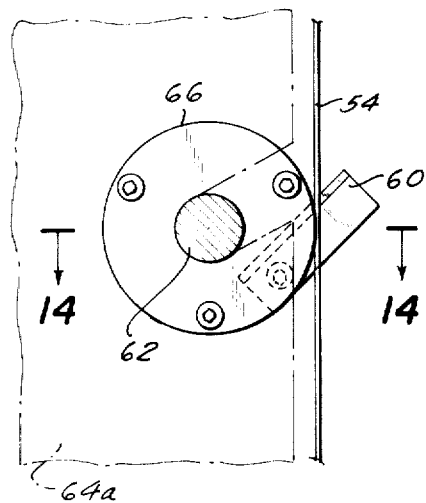
FIG. 13 is an enlarged side view of the adjustable film slitting device of the packaging machine of this invention for cutting the cover sheet of film in alignment with the longitudinal margin between the packages.
Figure 14:
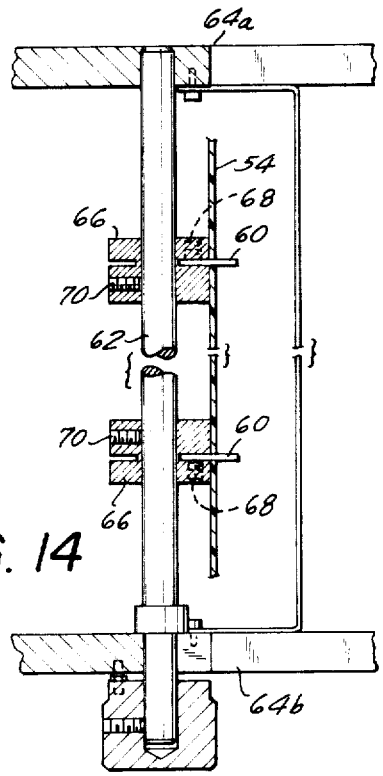
FIG. 14 is a sectional view taken along line 14—14 of FIG. 13 illustrating the mounting means for the adjustable slitting device.

The longitudinal severing of the cover sheet 54 is illustrated in FIGS. 2, 13, and 14, where the cutting of the cover sheet 54 is shown during movement between the guide roll 56d and guide roll 57 in order to provide an opening allowing the packages to be evacuated in an advantageous manner described hereafter. The cover sheet 54 is longitudinally severed at a point or points which are aligned with the longitudinal spacing or margin 32b between the receptacles 32 formed in the support sheet 18. When the vacuum packaging machine 10 is set up to form and seal three packages per transverse row, as illustrated in FIG. 2, the cover sheet 54 is severed at two points aligned with longitudinal margins 32b. The packaging machine 10 may also be conveniently set up to form and seal two packages per transverse row, in which case the cover sheet 54 is only severed at a single point aligned with the single longitudinal margin 32b between the pair of receptacles 32.

Slitters or cutting blades 60 are adjustably mounted on the packaging machine 10 for convenient adjustment in position for cutting the cover sheet 54 in alignment with the margin 32b between the receptacles 32 in order to adjust to the preset receptacle arrangement. When the machine 10 is set up to form and seal three packages in a transverse row, as illustrated in FIG. 2, two cutting blades 60 are adjustably mounted on a shaft 62 which is supported at opposite ends by vertical frame members 64a and 64b. The cutting blades 60 are each secured to a support hub 66 by means of a set screw 68. The support hub 66 is slideable on the shaft 62 and is releasibly secured thereto by means of another set screw 70. As is apparent from FIG. 14, loosening of set screw 70 allows the support hub to be moved along the shaft 62 in order to align the cutting blade 60 with the longitudinal margin 32b between the receptacles 32. When only two packages are being formed per transverse row and only one blade 60 is required for use, the hub 66 may be rotated to place only one blade in an operative position.

After having been longitudinally severed and passed under the guide roll 57, the cover sheet 54 is applied over the support sheet 18 and the sheets are then heat sealed along the transverse margin 32a. This step is accomplished by a cross sealing device 71 having a stationary upper cross sealing bar 72 supported between a pair of vertical posts 74 mounted on the base 12. A movable lower cross sealing bar 76 is slideably mounted on the posts 74 for periodic elevation by an air operated piston and cylinder device 78. The machine control means causes the device 78 to elevate the lower sealing bar 76 into contact with the underside of the support sheet 18 along the transverse margin 32a at the appropriate intermittent intervals whereby the sheets 18 and 54 are firmly pressed together between the sealing bars 72 and 76. Conventional electrical heating means in the bars then heat the contiguous portions of film causing the sheets 18 and 54 to be sealed along an air tight cross seam 80 between the packages.

The packaging machine 10 is provided with two sets of cross sealing bar devices 71, as illustrated in FIGS. 2 and 3, for simutaneously making two cross seams 80 between the receptacles 32 when the packaging machine is set up to process two transverse rows of packages during each packaging step. When the packaging machine 10 is set up to sequentially process a single transverse row of packages, as illustrated in FIG. 4, one set of cross sealing bar devices 71 may be made inoperative so that only one cross seam 80 is formed between the receptacles 32 at each packaging step.

Subsequently, the partially sealed packages are transported to an evacuation unit, generally designated by the reference numeral 100, where the final sealing and evacuation steps take place. In a manner described in detail hereinafter, the sheets 18 and 54 are first heat sealed in the evacuation unit 100 only along the two outer longitudinal margins 32b on opposite edges of the sheets 18 and 54 to form edge seams 82. At this point, the sheets 18 and 54, adjacent an inner longitudinal margin 32b, are advantageously left unsealed except for the portion traversed by the cross seam 80. The evacuation unit 100, then applies a vacuum to the interior of the packages through the opening in the longitudinally severed cover sheet 54 adjacent an inner margin 32b. After the evacuation of the packages has been completed, the evacuation unit 100 then heat seals the sheets 18 and 54 along the inner margin 32b to form a longitudinal inner seam 84.

The progressive forming of the air tight seams is illustrated diagrammatically in FIGS. 3a, 3b, and 3c, for the mode of operation where two transverse rows with three packages per transverse row are processed sequentially at each step. FIG. 3a illustrates the two transverse seams 80 initially formed by two cross sealing devices 71 in the manner shown in FIG. 3. Subsequently, the evacuation unit 100 then forms the edge seams 82 shown in FIG. 3b on opposite sides of the sheets 18 and 54. At this point the two interior longitudinal margins 32b remain unsealed except for the portions traversed by the cross seam 80 thereby providing four evacuation openings 86 in the cover sheet 54 which openings 86 communicate with the interior of the packages to allow three packages in a transverse row to be evacuated from only two openings. The evacuation unit 100 then applies a vacuum to the openings 86 thereby causing the lips 54a and 54b of the cover sheet 54 to spread apart in the manner shown in FIG. 3b. Also illustrated in FIG. 3b is the fact that after the formation of the edge seams 82, the receptacles 32 in the outer longitudinal rows are sealed on three sides, whereas the receptacles 32 in the interior longitudinal row are only sealed on two sides. After the packages are evacuated, the evacuation unit 100 then closes the evacuation openings 86 by heat sealing thereby forming the inner seams 84 shown in FIG. 3c.

In a similar manner, FIGS. 4a, 4b, and 4c illustrate the progressive formation of the seams 80, 82, and 84 where only one transverse row with two packages per row is being processed in the manner shown in FIG. 4. FIG. 4b shows that the two packages, in the single transverse row being processed, are each sealed on three sides only, and that the contiguous fourth sides are left unsealed to provide the evacuation opening 86. At this point it should be noted that the advantageous packaging apparatus and method of this invention provides the highly desirable capacity of evacuating a plurality of packages during each step of the packaging process.

DETAILS OF THE EVACUATION UNIT

The preferred construction of the evacuation unit 100 for use in the highly advantageous packaging apparatus and method of this invention is best illustrated in FIGS. 9–12. For clarity of illustration the evacuation unit 100 illustrated in FIGS. 9–12 is adapted to seal and evacuate two packages per transverse row and one or more packages per longitudinal row during each packaging cycle. The evacuation unit 100 has a stationary head 120 releasibly supported on opposite sides by a pair of vertically extending posts 122 fixedly mounted on the base plate 12a. The head 120 is releasibly secured to the posts 122 by conventional fasteners holding the head 120 between shoulder plates 124 and half turn lock nuts 126 in order to allow the head 120 to be readily removed for maintenance or for substitution of other heads adapted for different longitudinal package row arrangements. The head 120 may also be adapted for packaging modes showing three or four packages per transverse row. For instance FIG. 2 illustrates a head 120 adapted for packaging three packages per transverse row.

An evacuation chest 130 is slideably mounted on the posts 122 by means of a support plate 131 having sleeves 132 positioned on opposite sides thereof. The posts 122 are disposed within bores or the sleeves 132 which have appropriate internal bearing surfaces to allow the evacuation chest to be readily moved into and out of sealing engagement with the head 120.

Figure 12:
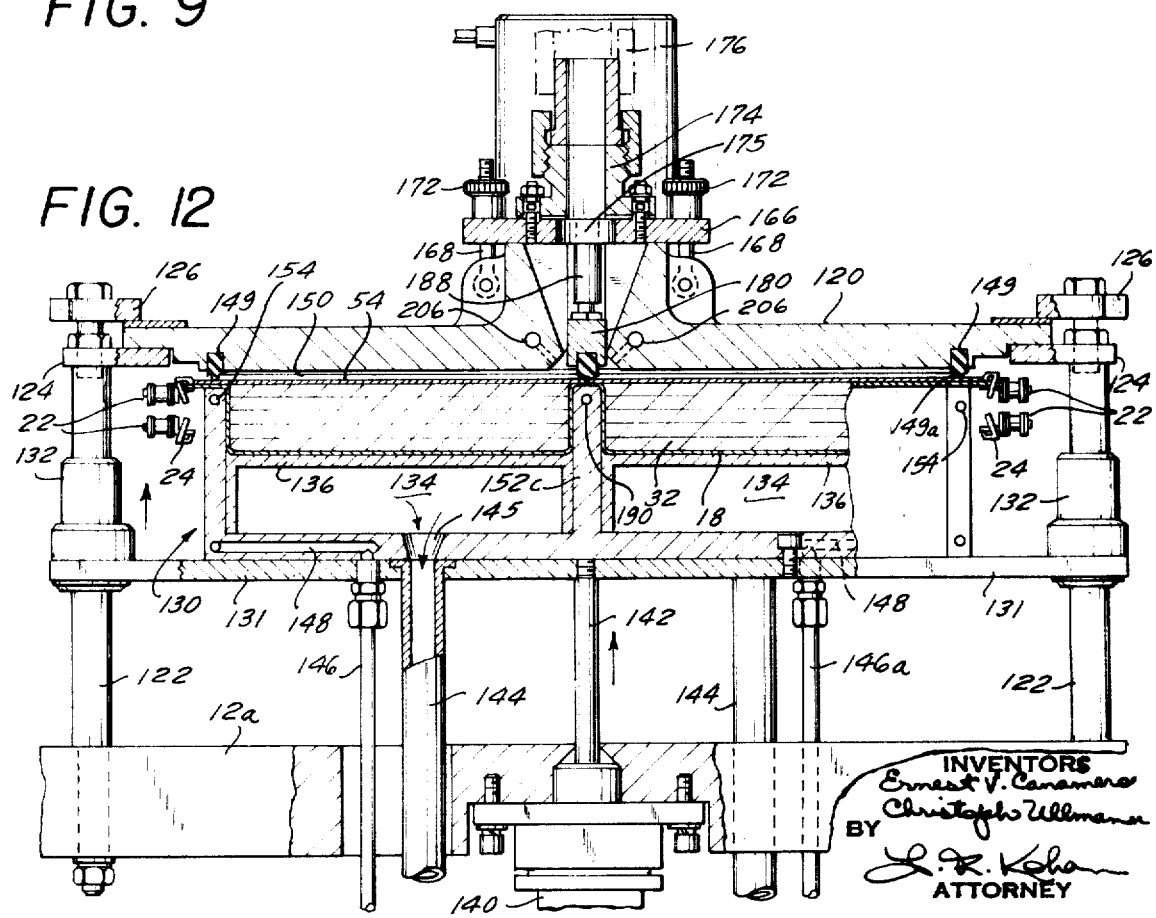
FIG. 12 is a sectional view taken generally along line 12—12 of FIG. 9 illustrating the evacuation unit during the final sealing after evacuation of the packages.
Figure 11:
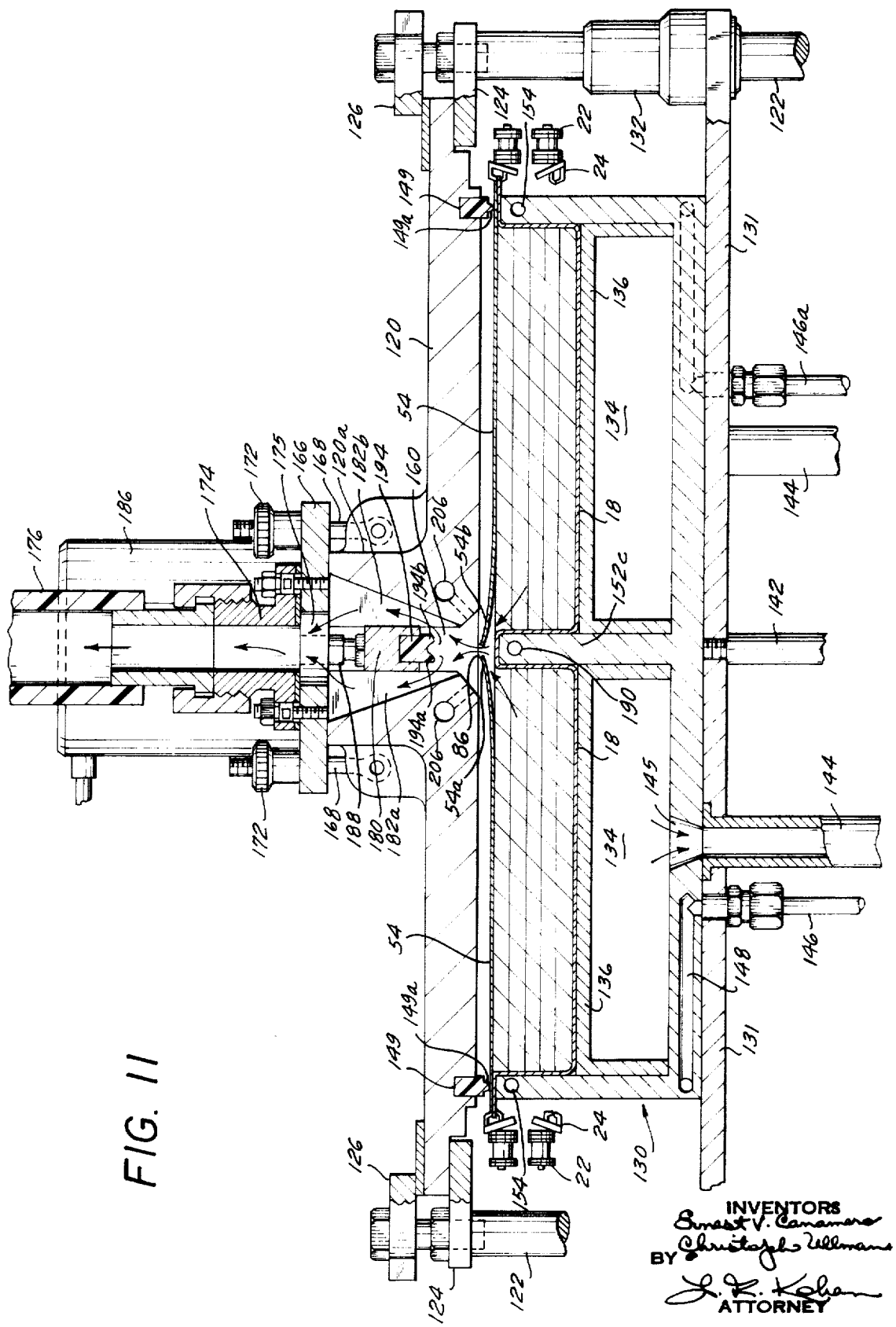
FIG. 11 is an enlarged sectional view taken generally along line 11—11 of FIG. 9 illustrating the evacuation unit in the closed position at the time a vacuum is applied to the packages.

A plurality of aligned and spaced evacuation chambers 134 configured to receive the receptacles 32 in the support sheet 18 are formed in the evacuation chest 130. The shape and size of each evacuation chamber 134 is adapted to conform to the preset size and shape of the receptacles 32 formed in the support sheet 18 by the forming unit 30. A filler 136 may be placed in the bottom of the chambers 134 when the depth of the individual receptacles 32 is not sufficient to fill an entire evacuation chamber 134. As illustrated in FIGS. 11 and 12, the filler 136 supports the bottom of the receptacles 32 during the evacuation and sealing process.

The number and arrangement of the chambers 134 provided in the chest 130 conforms to the preset mode of packaging one or more transverse rows with two or more packages per row. Thus the chest 130 may have one or more chambers 34 per longitudinal row and two or more chambers 134 per transverse row. The chest 130 is releasibly mounted for substitution of other chests having a chamber configuration adapted to the desired packaging mode. Accordingly when a packaging mode is decided upon, the particular forming die 30b, head 120 and chest 130 selected for use must be designed to conform to the preset package row configuration.

The elevation and lowering of the evacuation chest 130 at the appropriate time in the packaging cycle is accomplished by means of an air operated piston and cylinder device 140 fastened to the base plate 12a. A piston rod 142 extends from the device 140 and has its outer end fastened to the chest support plate 131 so that actuation of the device 140 by the machine control means causes movement of the evacuation chest 130 between the open position shown in FIG. 10 to the sealing and evacuation position shown in FIGS. 11 and 12. An appropriate dwell time for sealing and evacuation is provided for when the chest 130 is in the elevated position.

A vacuum is maintained on the underside of the packages in the chambers 134 to prevent the collapse thereof when the interior of the packages are being evacuated. For this purpose a vacuum line 144 communicates with the interior of each chamber 134 through a suitable aperture 145 in the floor of the evacuation chest 130. The vacuum line 144 is adapted to move upwardly with the evacuation chest 130 by being connected to a vacuum source, not shown, by a flexible conduit or other suitable means. The filler 136 is undersized to allow a vacuum to be applied on the underside of each receptacle 32 within each chamber 134 when the interior of the packages are being evacuated.

In order to remove excess heat which may accumulate in the metal evacuation chest 130 during the heat sealing of the sheets 18 and 54 cooling inlet and outlet lines 146 and 146a are connected to the evacuation chest 130 in communication with cooling passages 148 formed in the evacuation chest 130. For the purpose of allowing the cooling lines 146 and 146a to move with the evacuation chest 130 these lines are connected to a source of cooling water by a flexible hose or other suitable means.

Figure 10:
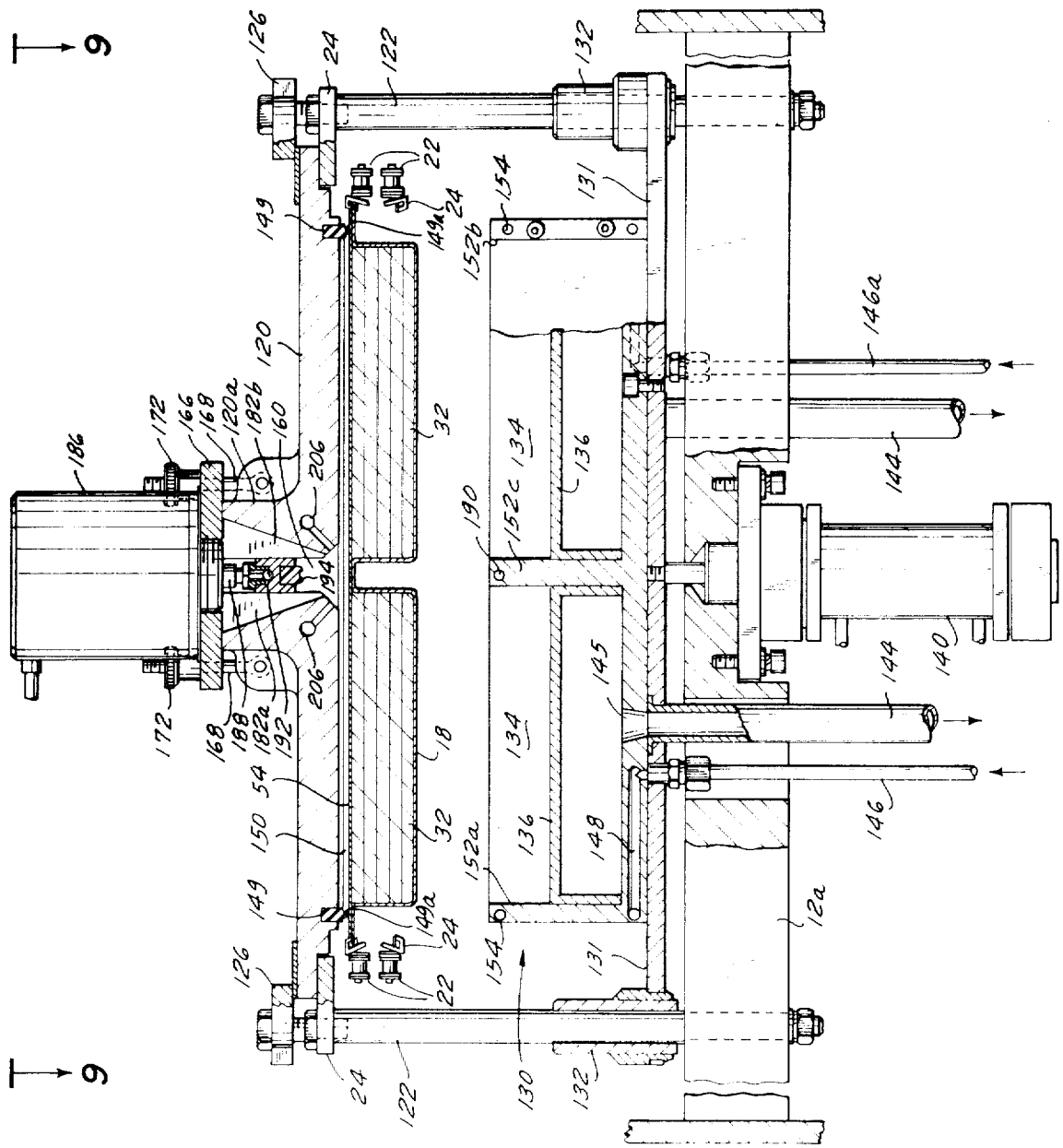
FIG. 10 is a partial sectional view taken generally along line 10—10 of FIG. 9 illustrating the evacuation unit in the package receiving or open position.

During the transport phase of the packaging cycle the film conveyance apparatus 21 moves a fresh group of packages into position over the evacuation chambers 134 at the time when the evacuation chest 130 is in the lower or opened position illustrated in FIG. 10. Subsequently, upon completion of the indexing movement of the film conveyance apparatus 21, the air operated cylinder and piston device 140, upon actuation by the machine control means, moves the evacuation chest 130 from the position illustrated in FIG. 10 to a closed or sealing and evacuating position illustrated in FIG. 11, whereby the partially sealed packages are received in the chambers 134.

Elevation of the chest 130 into the closed position brings longitudinal pressure strips 149 on opposite sides of the head 120 and transverse pressure strips 150 on the front and back side of the head 120 into mating relationship with the top surfaces of the rectangularly shaped evacuation chest walls 152 whereby transverse margins 32a and outer longitudinally margins 32b are clamped in an air tight manner between the head 120 and the chest 130. The pressure strips 149 and 150 are made of a resilient material with a nose portion 149a provided to push aside any foreign material that may be inadvertently disposed on the cover sheet 54 in order to insure a uniform application of pressure.

Electrical heating elements 154 disposed relatively close to the surface of the longitudinal walls 152a and 152b of the evacuation chest 130 heat the contiguous surfaces of the outer longitudinal margins 32b causing the sheets 18 and 54 to be heat sealed thereby forming air tight edge seams 82.

As the edge seams 82 are formed, a vacuum is applied to each evacuation opening 86 provided in the cover sheet 54 in alignment with the inner longitudinal margin 32b in the advantageous manner illustrated in FIG. 11. Application of the vacuum causes lips 54a and 54b of the cover sheet 54 adjacent the opening 86 to move upwardly and spread apart to allow the interior of the packages to be evacuated. The vacuum is applied along the length of the opening or openings 86 by means of an elongated evacuation channel 160 formed in the head 120. The evacuation channel 160, illustrated in FIGS. 9 and 10, extends internally generally the length of the head 120 and is aligned with the one or more openings 86 depending on the preset packaging mode.

The evacuation channel 160 is provided with an upwardly extending rib portion 120a which is formed along the length of the head in alignment with the longitudinal margin 32b between the packages. A cover plate 166 is releasibly secured on top of the rib portion 120a to enclose evacuation channel 160 in an air tight manner. A plurality of fastening rods 168 pivotably mounted on the head 120 are movable into slots 170 in the coverplate 166 to releasibly secured the plate 166 on the rib portion 120a by means of knurled lock nuts 172. A nipple 174 is bolted on the cover plate 166 and communicates with the evacuation channel 160 on one side through an apperture 175 in the cover plate 166 and with a flexible vacuum hose 176 on the opposite sides. The vacuum hose 176 is connected in the usual manner to a vacuum source that exhausts the air in the packages in the manner described above.

After the packages have been evacuated and while the vacuum is being applied the opening 86 is closed and the sheets 18 and 54 are heat sealed along the inner longitudinal margin 32b and lips 54a and 54b thereby forming the inner seam 84. To accomplish this step, a movable sealing bar 180 is slideably mounted within the evacuation channel 160 for movement between the upper position illustrated in FIG. 11 and the lower sealing position illustrated in FIG. 12 where the sealing bar 180 cooperates with a center wall 152c of the evacuation chest 130 to close the openings 86. A pair of guide ribs 182a and 182b are provided within the evacuation channel 160 on the font end of the head 120 and a second pair of cooperating guide ribs 184a and 184b are provided at the other end of the evacuation channel 160 at the back side of the head 120 for directing the sliding movement of the sealing bar 180.

A conventional pneumatically operated device 186, governed by the machine control means operates the sealing bar 180. The pneumatic device 186 has a piston rod 188 extending downwardly therefrom which is connected to the sealing bar 180 on its lower end. At the appropriate time in the packaging cycle, the pneumatic device 186 moves the sealing bar 180 from the upper position illustrated in FIG. 11 to the sealing position illustrated in FIG. 12 at which time the opening 86 is closed and the sheets 18 and 54 are firmly engaged between the sealing bar 180 and the center wall 152c of the evacuation chest 130. When the sealing pressure has been applied to the internal longitudinal margin 32b of the support sheet 18 and the lips 54a and 54b of the cover sheet 54 a conventional heating element 190 in the center wall 152c of the evacuation chest 130 heats the contiguous film areas to form the inner seam 84 thereby finally hermetically sealing the packages.

To insure that the sealing pressure is applied uniformly, the sealing bar 180 is connected to the piston rod 188 by means of a ball and socket joint 192. In addition, the sealing bar 180 has a center pressure strip 194 of resilient material having spaced nose portions 194a and 194b adapted to push aside foreign material to insure an even application of sealing pressure.

In the event it is desirable to package the items in an inert gas, a gas manifold 202, attached to the back end of the head 120, is provided to supply an inert gas to the head 120. The manifold 202 is supplied with gas through a nipple 204 connected in the usual manner to an inert gas supply. Internal chambers 202a in the manifold 202 communicate with the supply nipple 204 on one side and with gas passages 206 formed in the head 120 which direct the inert gas toward the evacuation opening 86 of the packages. When desired, the machine control means causes the inert gas to be supplied after the packages have been evacuated and before the closure of the evacuation opening 86 by the sealing bar 180.

PACKAGE SEPARATION

After the evacuation and sealing steps have been accomplished, the evacuation chest 130 is lowered and the completely formed and evacuated packages are transported from the evacuation unit 100 by the film conveyance apparatus 21 into cross cutting devices 210 where the packages are severed transversely at the center of the cross seam 80.

Each of the cross cutting devices 210, illustrated in FIG. 2, have a backing bar 212 fixedly mounted between a pair of vertical posts 214 attached to the base 12. The backing bar 212 cooperates with vertically movable cutting bar 215 which has a suitable cutting blade thereon for severing the packages transversely at the cross seams 80. The cutting bar 215 is elevated and lowered intermittently by an air operated piston and cylinder device 216 that is actuated by the machine control means. Operation in the packaging mode illustrated in FIG. 3 requires that the two cross cutting devices 210 be actuated simultaneously to sever the two transverse rows being processed at each step. When a single transverse row of packages is being sequentially processed, one of the cross cutting devices 210 may be made inactive for operation in the packaging mode shown in FIG. 4.

After the cutting of the cross seams 80, the packages are transported to the extreme left hand end of the machine 10, as viewed in FIG. 2, where circular cutting blades 217 sever the packages longitudinally along the center portion of the inner seams 84 between the packages whereupon the individual packages are discharged from the machine 10.

ALTERNATE DRIVE MODE

The vacuum packaging machine 10 of this invention may be driven either in the indexing manner described above, wherein the film conveyance apparatus 21 operates intermittently with the various packaging operations taking place while the drive means is periodically arrested to provide a dwell time for the accomplishment of the packaging steps; or the machine 10 can be adapted to operate with the film conveyance apparatus 21 transporting the sheets of film in a continuous manner for the length of the machine 10. For operation in the later continuous mode, conventional apparatus may be provided to periodically advance the packaging devices along with the continuously moving sheets of film and to return the packaging devices to the starting position.

Figure 15:
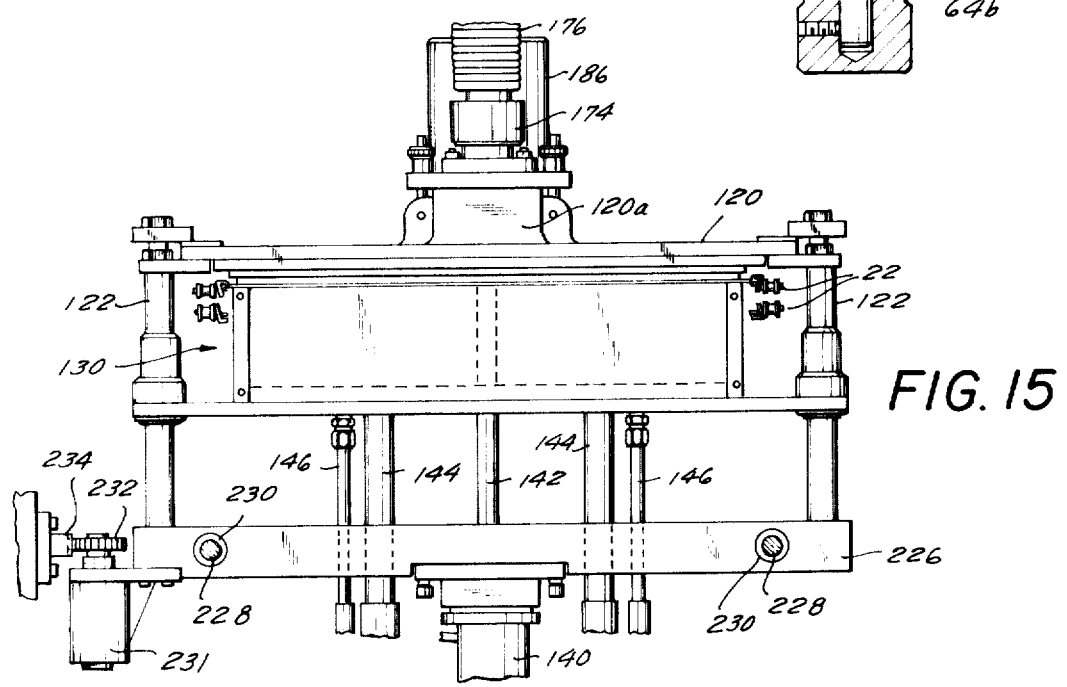
FIG. 15 is a partial front view of an evacuation unit of the packaging machine of this invention illustrating apparatus adapting the machine to operate in a mode where the sheets of film are transported in a continuous manner.
Figure 16:
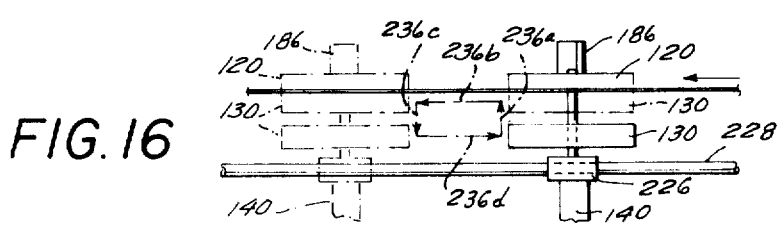
FIG. 16 is a diagrammatic side view of the evacuation unit and apparatus of FIG. 15 with arrows indicating the path followed by the evacuation unit when adapted to operate in a continuous mode.

Suitable apparatus is illustrated in FIGS. 15 and 16 for mounting the evacuation unit 100 so that it periodically advances along with the continuously moving sheets 18 and 54 and then returns to the starting position. In this modification the evacuation unit 100 has its support posts 122 mounted on a movable frame 226 that is slideable on bearing members 230 along aligned horizontal guide rods 228 mounted on the base 12.

The air operated piston and cylinder device 140 is also mounted on a frame 226 and is connected by suitable flexible conduits to a source of compressed air. The vacuum lines 144 and the cooling lines 146 and 146a are connected to suitable sources of supply by means of conventional flexible conduits. In order to periodically advance and return the evacuation unit 100, a reversible electric motor 236 is provided that is mounted on the base 12 and has a pinion gear 232 engaged with a rack gear 234 attached to the base 12.

As indicated by the arrows in FIG. 16, after the piston and cylinder device 140 elevates the chest 130 in the direction indicated by the arrow 236a, the motor 231 advances the frame 226 and the evacuation unit 100 along with the continuously moving film in the direction indicated by the arrow 236b, whereby the evacuation and sealing step described above is accomplished. Subsequently, the air operated piston and cylinder device 140 lowers the evacuation chest in the direction indicated by the arrow 236c. The reversible motion 231 then returns the frame 226 and evacuation unit 100 to its starting position in the direction indicated by the arrow 236c. The forming unit 30, the cross sealing devices 71, and the cross cutting devices 210 are also mounted in a similar manner when the machine 10 is adapted to operate in a continuous mode.

It will be understood that the foregoing description with the details of exemplary structure is not to be construed in any way to limit the invention, but that modification may be made thereto without departing from the scope of the invention as set forth in the following claims.

Having thus described the invention, the following is claimed:

1. A method of making hermetically sealed packages from which air has been exhausted including: supplying a support sheet of packaging material having a plurality of spaced receptacles formed therein; filling said receptacles with the items to be packaged; severing the web of a cover sheet of packaging material in alignment with the space between the receptacles; applying said cover sheet over said support sheet to enclose said receptacles and the items therein; sealing said cover sheet to said support sheet transversely between the receptacles and along the outer longitudinal edges of said sheets; evacuating air from said receptacles through the opening formed by the severed cover sheet; and sealing said opening.

2. A method of making hermetically sealed packages from which air has been exhausted including: supplying a continuous support sheet of packaging material; forming a plurality of spaced receptacles in said support sheet; filling said receptacles with the items to be packaged; severing the web of a cover sheet of packaging material in alignment with the space between the receptacles; applying said cover sheet over said support sheet to enclose said receptacles and the items therein; heat sealing said cover sheet to said support sheet transversely between the receptacles and along the outer longitudinal edges of said sheets; evacuating air from said receptacles through the opening formed by the severed cover sheet; and heat sealing said cover sheet adjacent said opening to said support sheet along the space between said receptacles.

3. A method of making hermetically sealed packages from which air has been exhausted including: supplying a continuous support sheet of packaging material; forming a plurality of receptacles in said support sheet in aligned longitudinal and transverse rows with transverse and longitudinal margins about the periphery of said receptacles; filling said receptacles with the items to be packaged; longitudinally severing the web of a continuous cover sheet of packaging material in alignment with the inner longitudinal margins between the receptacles; applying said continuous cover sheet over said support sheet to enclose said receptacles and the items therein; sealing said cover sheet to said support sheet along the transverse margins between said receptacles; sealing said cover sheet to said support sheet along the outer longitudinal edge margins of the sheets; evacuating the air from said packages through the evacuation opening provided by the severed cover sheet; and heat sealing said cover sheet adjacent said opening to said support sheet along said inner longitudinal margins.

4. A method of making hermetically sealed packages from which air has been exhausted including supplying a continuous support sheet of packaging material; forming a plurality of receptacles in said support sheet in aligned spaced rows; filling said receptacles with the items to be packaged; longitudinally severing the web of a continuous cover sheet of packaging material in alignment with the space between the receptacle rows; applying said continuous cover sheet over said support sheet to enclose said receptacles and the items therein; heat sealing said cover sheet to said support sheet transversely between said rows of receptacles; heat sealing said cover sheet to said support sheet along the outer longitudinal edges of the sheets; evacuating the air from said packages through the evacuation opening provided by the severed cover sheet; and heat sealing said cover sheet adjacent said opening to said support sheet.

5. A method of making hermetically sealed packages from which air has been exhausted including: supplying a continuous support sheet of plastic film; vacuum forming a plurality of receptacles in said support in aligned longitudinal and transverse rows with transverse and longitudinal margins about the periphery of said receptacles; filling said receptacles with the items to be packaged; longitudinally severing the web of a continuous cover sheet of flexible plastic material in alignment with the inner longitudinal margins between the receptacles prior to the application of said cover sheet over said support sheet; applying said continuous cover sheet over said support sheet to enclose said cover sheet to said support sheet along the transverse margins between said receptacles; sequentially disposing successive groups of said enclosed receptacles in an evacuation unit; heat sealing said cover sheet to said support sheet along the outer longitudinal edge margins of the sheets while in said evacuation unit; evacuating the air from said receptacles through the evacuation opening provided by said severed cover sheet while in said evacuation unit; and heat sealing said cover sheet adjacent said opening to said support sheet along said inner longitudinal margin while in said evacuation unit; and removing the packages formed therein from the evacuation unit.

6. A method of making hermetically sealed packages from which air has been exhausted including: supplying a continuous support sheet of deformable plastic film; conveying said support sheet with an unsupported web through the subsequent packaging steps; moving said support sheet in an intermittent mode providing periodic dwell periods for performance of the subsequent packaging steps; vacuum forming a plurality of receptacles in said support sheet in aligned longitudinal and transverse rows with transverse and longitudinal margins about the periphery of said receptacles; filling said receptacles with the items to be packaged; longitudinally severing the web of a continuous cover sheet of flexible plastic material in alignment with the inner longitudinal margins between the receptacles; applying said continuous cover sheet over said support sheet to enclose said receptacles and the items therein; heat sealing said cover sheet to said support sheet along the transverse margins between said receptacles; heat sealing said cover sheet to said support sheet along the outer longitudinal edge margins of the sheets; sequentially disposing successive groups of said enclosed receptacles in an evacuation chest; evacuating air from said receptacles through the evacuation opening provided by said severed cover sheet while in said evacuation chest; and heat sealing said cover sheet adjacent said opening to said support sheet along said inner longitudinal margin while in said evacuation chest; and removing the packages formed therein from the evacuation chest.

7. A method of making hermetically sealed packages from which air has been exhausted including: supplying a continuous support sheet of plastic film; conveying said support sheet with an unsupported web through the subsequent packaging steps; sequentially vacuum forming successive groups of receptacles in said support sheet in two aligned longitudinal rows and a single aligned transverse row with transverse and longitudinal margins about the periphery of said receptacles; filling said receptacles with the items to be packaged; constantly longitudinally severing the web of a continuous cover sheet of flexible plastic material at one point in alignment with the inner longitudinal margins between said receptacles prior to the application of said cover sheet over said support sheet; applying said continuous cover sheet over said support sheet to enclose said receptacles and the items therein; heat sealing said cover sheet to said support sheet along the transverse margins between said receptacles; sequentially disposing said successive groups of said enclosed receptacles in an evacuation unit; heat sealing said cover sheet to said support sheet along the outer longitudinal edge margins of the sheets while in said evacuation unit; evacuating the air from said receptacles through the evacuation opening provided by said severed cover sheet while in said evacuation unit; and heat sealing said cover sheet adjacent said opening to said support sheet along said inner longitudinal margin while in said evacuation unit; and removing the packages formed therein from said evacuation unit.

8. A method of making hermetically sealed packages from which air has been exhausted including: supplying a continuous support sheet of plastic film; conveying said support sheet with an unsupported web through the subsequent packaging steps; sequentially vacuum forming successive groups of receptacles in said support sheet in three aligned longitudinal rows and two aligned transverse rows with transverse and longitudinal margins about the periphery of said receptacles;

filling said receptacles with the items to be packaged; constantly longitudinally severing the web of a continuous cover sheet of flexible plastic material at two points in alignment with the two inner longitudinal margins between the receptacles prior to the application of said cover sheet over said support sheet; applying said continuous cover sheet over said support sheet to enclose said receptacles and the items therein; heat sealing said cover sheet to said support sheet along the transverse margins between said receptacles; sequentially disposing said successive groups of said enclosed receptacles in an evacuation unit; heat sealing said cover sheet to said support sheet along the outer longitudinal edge margins of the sheets while in said evacuation unit; evacuating the air from said receptacles through the evacuation opening provided by said severed cover sheet while in said evacuation unit; and heat sealing said cover sheet adjacent said opening to said support sheet along said inner longitudinal margin while in said evacuation unit; and removing the packages formed therein from said evacuation unit.

9. A packaging machine for making packages from continuous sheets of film including a plurality of transversely spaced evacuation chambers, transport means supplying a support sheet to said chambers, said support sheet having receptacles for items to be packaged formed in said sheet in transverse groups, said transport means supporting said support sheet generally at opposite edges with the unsupported web there between being supplied over said chambers, means for supplying a cover sheet over said support sheet, severing means for longitudinally cutting said cover sheet in alignment with the space between said chambers, means for placing said chambers and said support sheet in engagement so that a group of said receptacles are disposed in said chambers, means for sealing together said cover and support sheets about the periphery of a group of receptacles leaving said sheets of film unsealed adjacent the space between said chambers, means cooperating with said chambers for evacuating said receptacles through the opening provided by the severed cover sheet adjacent the space between said chambers, and means for sealing said cover and support sheets adjacent to the space between said chambers.

10. The packaging machine of claim 9 wherein said means cooperating with said chambers for evacuating said receptacles is a stationary head mounted on said machine above said evacuation chambers; said head having an elongated evacuation channel extending in alignment with the space between said chambers.

11. The packaging machine of claim 10 wherein said means for sealing said cover and support sheets adjacent to the space between said chambers is an elongated sealing bar slideably mounted within said evacuation channel.

12. The packaging machine of claim 11 wherein said chambers are formed in an evacuation chest slideably mounted for vertical movement between an open position and an elevated or closed position in sealing engagement with said head.

13. The packaging machine of claim 12 wherein said severing means for longitudinally cutting said cover sheet has a plurality of adjustable cutting blades mounted on the machine frame for cutting said cover sheet at one or more points prior to the application of said cover sheet over said support sheet.

14. Packaging apparatus for making hermetically sealed packages from which air has been exhausted including: a roll of film supplying a continuous sheet of packaging material; forming means for making a plurality of receptacles on said support sheet in aligned longitudinal and transverse rows with transverse and longitudinal margins about the periphery of said receptacles; supplying means for providing a continuous cover sheet of packaging material; a cutting device longitudinally severing the web of said cover sheet in alignment with the longitudinal margins between the receptacles; means for applying said continuous cover sheet over said support sheet to enclose the receptacles and the items therein; transverse sealing means for heat sealing said cover sheet to said support sheet along the transverse margins between said receptacles; evacuation and sealing means for heat sealing said cover sheet to said support sheet along the outer longitudinal edge margins of the sheets; evacuating air from said receptacles through the evacuation opening provided by the severing of said cover sheet; and heat sealing said cover sheet adjacent said opening to said support sheet along said inner longitudinal margins.

15. The packaging apparatus of claim 14 wherein said evacuation and sealing means has a stationary head mounted on said machine and an evacuation chest which is periodically movable upward into sealing engagement with said head.

16. The packaging apparatus of claim 15 wherein said evacuation head has an elongated evacuation channel extending in alignment with the opening in said severed cover sheet.

17. The packaging apparatus of claim 16 wherein an elongated sealing bar is movably mounted on said head in said evacuation channel for closing and sealing said opening.

18. The packaging apparatus of claim 17 wherein said cutting device has a plurality of adjustable blades mounted on the apparatus frame for constantly cutting said cover sheet at one or more points prior to the application of said cover sheet over said support sheet.

* * * * *